United States Patent [19]

Tolley

[11] 4,137,292
[45] Jan. 30, 1979

[54] PURIFICATION OF TITANIUM TRICHLORIDE

[75] Inventor: William K. Tolley, Arlington Heights, Ill.

[73] Assignee: UOP Inc., Des Plaines, Ill.

[21] Appl. No.: 882,845

[22] Filed: Mar. 2, 1978

[51] Int. Cl.$^2$ .................. C01G 23/02; C01G 23/04
[52] U.S. Cl. ................................. 423/75; 423/69; 423/492; 423/611
[58] Field of Search .............. 423/69, 75, 492, 611

[56] References Cited

U.S. PATENT DOCUMENTS

| | | | |
|---|---|---|---|
| 2,720,281 | 10/1955 | Ruehrwein et al. | 423/69 |
| 2,734,797 | 2/1956 | Skinner | 423/492 |
| 3,201,192 | 8/1965 | Siggel et al. | 423/492 |
| 3,615,178 | 10/1971 | Giucciardi et al. | 423/69 |
| 4,070,252 | 1/1978 | Bonsack | 423/492 |

FOREIGN PATENT DOCUMENTS

| | | | |
|---|---|---|---|
| 207659 | 4/1957 | Australia | 423/492 |
| 905370 | 9/1962 | United Kingdom | 423/492 |
| 1213089 | 11/1970 | United Kingdom | 423/492 |

Primary Examiner—Herbert T. Carter
Attorney, Agent, or Firm—James R. Hoatson, Jr.; Raymond H. Nelson; William H. Page, II

[57] ABSTRACT

Titanium trichloride which is obtained during one step of a process for recovering titanium metal values from a titanium bearing source which still contains some impurities such as iron and vanadium compounds may be purified by drying the titanium compound in an air atmosphere, further drying under a carbon monoxide atmosphere and thereafter roasting the dried compound in the presence of chlorine at an elevated temperature to separate the impurities from the desired titanium compounds.

1 Claim, No Drawings

PURIFICATION OF TITANIUM TRICHLORIDE

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, water-proofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

As will hereinafter be shown in greater detail, it is now possible to further purify the desired titanium metal values by freeing said metal values from remaining impurities such as iron and vanadium compounds, thus rendering the obtention of relatively pure titanium in a greater yield.

This invention relates to a novel method for purifying titanium compounds during a process for obtaining titanium metal values from a titanium bearing source. More specifically, the invention is concerned with a process for recovering titanium from a titanium bearing source such as ilmenite whereby a sharper separation of titanium from impurities contained therein may be accomplished.

It is therefore an object of this invention to provide an improvement in a process for the production of titanium.

A further object of this invention is to provide a hydrometallurgical process for the recovery of titanium from a titanium bearing source, the desired titanium being obtained in a relatively purer state.

In one aspect an embodiment of this invention resides in a process for the purification of a titanium chloride which comprises the steps of drying said titanium chloride in an air atmosphere, further drying said titanium chloride in a carbon monoxide atmosphere at an elevated temperature, roasting the dried titanium chloride at an elevated temperature in the presence of chlorine, separating the volatile impurities, and recovering the purified titanium compounds.

A specific embodiment of this invention is found in a process for the purification of titanium chloride which comprises the steps of drying titanium trichloride in an air atmosphere at a temperature below about 100° C., further drying said titanium trichloride in a carbon monoxide atmosphere at a temperature in the range of from about 250° to about 750° C., roasting the dry titanium trichloride at a temperature in the range of from about 400° to about 750° C. in the presence of chlorine, separating volatile iron and vanadium compounds, and recovering the purified titanium dioxide and titanium tetrachloride.

Other objects and embodiments will be found in the following detailed description of the present invention.

As hereinbefore set forth the present invention is concerned with a process for the purification of a titanium chloride which has been obtained during the processing of a titanium bearing source to obtain titanium metal values. The titanium bearing source such as ores including ilmenite, rutile, etc., which also contain other metals such as contaminants such as iron, vanadium, etc., are subjected to a reductive roast at an elevated temperature which will range from about 600° to about 900° C. or more in the presence of a reducing gas such as hydrogen or carbon monoxide. In the preferred embodiment, the reductive roast is effected on a metal bearing source such as an ore, which has been crushed to a particle size less than about 100 mesh, at a temperature of about 750° C. for a period ranging from about 0.5 up to about 2 hours or more. The reducing atmosphere which is used to accomplish the purpose of the roast usually comprises a mixture of about 50% carbon monoxide and 50% hydrogen with an excess of reductant being utilized in order to completey reduce the iron which is present in the system to the metal. Following the reductive roast of the metal bearing source, the source is then subjected to an aqueous hydrogen chloride leach which is also effected at an elevated temperature usually in the range of from about 80° to about 110° C. for a period of time ranging from about 0.25 hours up to about 1 hour or more in duration. Upon completion of the leach step, the resulting solution is thereafter cooled to a temperature ranging from about 0° to about 20° C. in order to effect a crystallization or precipitation of the ferrous chloride. The cooled solution, which is maintained in the subambient range hereinbefore set forth by external means such as an ice bath, cooling coils, etc., is then saturated with gaseous hydrogen chloride in order to insure a complete precipitation of the iron. After subjecting the solution which contains solid ferrous chloride and soluble titanium chloride to the aforesaid saturation step for a period of time which may range from about 0.5 up to about 2 hours or more in duration, the solution is subjected to a solid/liquid separation whereby the solid ferrous chloride crystals are separated from the soluble titanium compound contained in the leach liquor.

The solid ferrous chloride crystals may then be washed with water and treated at an elevated temperature of about 400° C. whereby gaseous hydrogen chloride is removed and recycled to the saturation and precipitation step of the process, the solids which comprise ferric oxide and gangue being removed and recovered.

The pregnant leach liquor which contains the solid titanium chloride compound as well as some impurities which have not been removed in their entirety by the previous steps is then passed to a warming stage wherein the temperature is raised to a range of from about 20° to about 30° C. In this warming stage the soluble titanium chloride will precipitate out as hydrated titanium trichloride crystals, said crystals also containing impurities such as iron, vanadium, chromium, cadmium, etc.

The recovered hydrated titanium trichloride may then be purified by subjecting the crystals to a series of purification steps. These steps will include drying the hydrated titanium trichloride in an oxidizing atmosphere which is provided for by air, said drying being effected at temperatures less than about 100° C. and preferably in a range of from about 25° to about 50° C.

Following the drying of the titanium trichloride in the air atmosphere, the crystals are then subjected to a further drying step utilizing a carbon monoxide atmosphere, said drying being effected at a temperature in the range of from about 250° to about 750° C. The pressure under which the further drying of the titanium trichloride is effected may range from about 1 to about 0.1 atmospheres, the drying of the crystals being effected during a period which may range from about 0.5 up to about 2 hours or more in duration, the time of drying being dependent upon the particular temperature and pressure which are employed during the drying step.

Following the drying of the crystals under a carbon monoxide atmosphere the crystals are then roasted at a temperature in the range of from about 400° to about 750° C. in the carbon monoxide atmosphere and in the presence of chlorine gas which is charged to the pressure resistant vessel employed in the reaction. In the preferred embodiment of the invention the combined carbon monoxide-chlorine pressure will range from about 1 to about 5 atmospheres. In addition, another operating parameter of the roasting step of the present invention involves the duration of said step, the roast being effected during a period of time which may range from about 0.5 to about 2 hours. Upon completion of the roasting step, the volatile impurities which comprise iron, vanadium, chromium, cadmium, etc., compounds which are in the form of vapors will be withdrawn and discharged from the operating vessel while the solids which comprise purified titanium tetrachloride and titanium dioxide may be recovered and passed to storage.

The process for the purification of titanium chloride may be effected in any suitable manner and may comprise a batch or continuous type operation. For example, when a batch type operation is used a quantity of the ore source is placed in an appropriate apparatus such as an oven wherein it is subjected to temperatures within the range hereinbefore set forth, that is, from about 600° to about 900° C. or more in the presence of a reductant which comprises a mixture of hydrogen and carbon monoxide gas. After undergoing the reductive roast the ore source may then be placed in a second apparatus which comprises a bleaching vessel. In this vessel the ore is leached at an elevated temperature ranging from 80° to 110° C. by contact with an aqueous hydrogen chloride leach solution. After being leached the solution is then placed in an apparatus which is maintained at subambient temperatures ranging from about 0° to 20° C. whereby crystallization of the iron compounds such as ferrous chloride is effected. In addition to maintaining the temperature of the leach solution in a subambient zone the leach solution is also contacted with gaseous hydrogen chloride in order to saturate the solution and insure as complete precipitation as possible of the iron compounds. After crystallization of the ferrous chloride the soluble titanium chloride in the leach liquor is separated from the solid ferrous chloride by conventional means such as decantation, filtration, centrifugal means, etc.

The liquid leach liquor which has been separated is then placed in still another apparatus wherein the leach liquor is warmed to a temperature ranging from about 20° up to about 30° C. or more in order to crystallize the titanium trichloride. The hydrated titanium trichloride crystals which may still contain unwanted compounds such as iron, vanadium, etc., compounds, is then placed in a drying apparatus and heated to a temperature less than about 100° C., the drying being effected in the presence of air. Thereafter the crystals are transferred to a drying oven in which they are further dried at an elevated temperature within the range hereinbefore set forth under a carbon monoxide atmosphere. After drying under the carbon monoxide atmosphere for a predetermined period of time, chlorine gas is charged to the apparatus while maintaining the temperature at a predetermined level within the range of from about 400° to about 750° C. The action of the chlorine gas on the crystals will result in the vaporization of the volatile iron and vanadium compounds which may be vented and recovered. After maintaining the apparatus under the predetermined carbon monoxide-chlorine pressure and temperature for the desired period of time heating is discontinued, any excess pressure is vented and the solid titanium tetrachloride and/or titanium dioxide which has been formed is recovered.

It is also contemplated within the scope of this invention that the process of said invention may be effected in a continuous manner. When such a type of operation is to be employed the ore source is continuously charged to a roasting oven wherein it is subjected to a reductive roast in the presence of a reductant of the type hereinbefore set forth, said roast being effected at temperatures ranging from about 600° to about 900° C. After passage through the oven for a predetermined period of time the ore is continuously discharged from said oven and charged to a leaching apparatus which is maintained at a temperature ranging from about 80° to about 110° C. In the leaching apparatus the source is contacted with an aqueous hydrogen chloride leach solution which is also continuously charged to the apparatus. After being leached at this temperature for a predetermined period of time the leach solution is continuously withdrawn and passed to a crystallization zone which is maintained at subambient temperatures within the range hereinbefore set forth. In the crystallization zone the leach solution is contacted with gaseous hydrogen chloride which is continuously charged to the crystallization zone in order to saturate the solution and assist in the precipitation of the ferrous chloride which is present in the ore source as a contaminant or impurity. The pregnant leach liquor is continuously withdrawn from the crystallization zone and passed to a second crystallization zone wherein the leach liquor is warmed to a temperature ranging from about 20° to about 30° C. or more. The raise in temperature will permit crystallization of the titanium trichloride as hydrated crystals. After a predetermined period of time in the crystallization zone the hydrated crystals are continuously withdrawn and separated from the spent leach liquor. The solid hydrated titanium trichloride crystals are then continuously passed to a drying oven wherein they are passed through said oven in an air atmosphere while maintaining the temperature below about 100° C. After continuous passage through this oven the crystals are charged to a second drying oven wherein they are subjected to a second drying step at an elevated temperature ranging from about 250° to about 750° C. under a carbon monoxide atmosphere, the carbon monoxide also being continuously charged to this oven. Upon completion of the second drying step, the crystals are continuously passed under a carbon monoxide atmosphere to a roasting oven wherein they are contacted with chlorine gas while maintaining the temperature within the range of from about 400° to about 750° C. After passage through this roasting oven for a predetermined period of time the impurities comprising iron compounds which were not precipitated out in the previous steps as well as vanadium compounds are withdrawn in the form of vapors or gases while the desired titanium values such as titanium tetrachloride and/or titanium dioxide are continuously withdrawn and passed to storage for further treatment, if so desired.

The following examples are given for purposes of illustrating the process of this invention. However, it is to be understood that such examples are given merely for purposes of illustration and that the present invention is not necessarily limited thereto.

EXAMPLE I

An ilmenite ore may be crushed and sized to −100 mesh. Following this the sized ilmenite ore may then be placed in a rotary quartz tube and heated to a temperature of 750° C. under an atmosphere of dry nitrogen. Upon reaching this roasting temperature the ore may then be roasted for a period of 1 hour to a stream of reducing gas consisting of 320 ml/min. of carbon monoxide and 320 ml/min. of hydrogen. At the end of this period the ore may be cooled under a nitrogen stream until it has reached room temperature. The ore may then be leached with 300 cc of a leach solution containing concentrated hydrochloric acid, the leach being effected at temperatures ranging from 85° to 100° C. under agitation for a period of 1 hour. The solution may then be allowed to cool and filtered. The pregnant leach liquor may then be placed in a flask and cooled from room temperature to about 5° C. by means of an ice bath and purged with hydrogen chloride gas until the solution is saturated. After allowing the solution to stand for a period of 0.5 hours during which time the ferrous chloride may precipitate out. The solids may then be removed by filtration and the pregnant leach liquor containing titanium trichloride may then be warmed to a temperature of 25° C. while maintaining the solution in an oxygen free atmosphere. The titanium trichloride will precipitate upon the temperature reaching 25° C.

Titanium tetrachloride crystals (4 grams) were then placed in a tube furnace and heated slowly to a temperature of 400° C. under a carbon monoxide blanket to dehydrate. Following this the crystals were then subjected to a roast under chlorine gas at a temperature of 750° C. for a period of 1 hour. At the end of this 1 hour heating was discontinued and the crystals were allowed to cool while maintaining the charge of chlorine gas. The residue which remained was analyzed and found to consist of 71% titanium, less than 0.1% iron and 0.05% vanadium. An X-ray analysis of the residue disclosed a strong rutile and weak anatase pattern.

EXAMPLE II

In this example 10 grams of titanium trichloride which is prepared in a manner similar to that set forth in Example I above was heated to 250° C. and dried under a blanket of carbon monoxide. Following this the charge was chlorinated for 15 minutes to remove ferrous chloride. The tube furnace and charge were then heated to a temperature of 450° C. under a carbon monoxide blanket and upon reaching this temperature were then chlorinated by the addition of chlorine gas for a period of 1 hour. When heating to a temperature of 250° C. and chlorinating, a small amount of copper colored crystals were blown out of the tube furnace while black crystals were formed in the furnace. The titanium trichloride turned brown upon the first chlorination while further heating at the elevated temperature caused a large build up of the copper colored crystals, which turned black from opening the furnace. Analysis of the black crystals showed that there was 0.01% titanium, 30% iron, with less than 0.001% vanadium present in the crystals. In addition, an X-ray analysis of the crystals showed that they were amorphous in form. At the end of the 1 hour chlorination at 450° C., the residue was a light brown solid. Analysis of the solid residue showed it to be 64% titanium, 1.8% iron and 0.1% vanadium while the X-ray analysis disclosed a strong rutile pattern plus an anatase pattern.

I claim as my invention:

1. A process for purifying titanium trichloride and recovering titanium dioxide and titanium tetrachloride which comprises the steps of:
   (a) drying said titanium trichloride in an air atmosphere at a temperature below about 100° C;
   (b) further drying said titanium trichloride in a carbon monoxide atmosphere at an elevated temperature in the range of from about 250° to about 750° C.;
   (c) roasting the dried titanium trichloride for about 0.5 to about 2 hours at an elevated temperature in the range of from about 400° to about 750° C in the presence of carbon monoxide and chlorine;
   (d) separating the volatile impurities; and
   (e) recovering purified titanium dioxide and titanium tetrachloride.